United States Patent
Cao et al.

(10) Patent No.: US 12,524,524 B2
(45) Date of Patent: Jan. 13, 2026

(54) INTELLIGENT OBFUSCATION OF MOBILE APPLICATIONS

(71) Applicant: Alipay (Hangzhou) Information Technology Co., Ltd., Zhejiang (CN)

(72) Inventors: Shijie Cao, Zhejiang (CN); Jiantao Zhang, Zhejiang (CN); Ning Zhang, Zhejiang (CN); Yao Yao, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 41 days.

(21) Appl. No.: 18/393,637

(22) Filed: Dec. 21, 2023

(65) Prior Publication Data

US 2024/0143739 A1    May 2, 2024

Related U.S. Application Data

(63) Continuation of application No. PCT/CN2022/104296, filed on Jul. 7, 2022.

(30) Foreign Application Priority Data

Sep. 13, 2021  (CN) .......................... 202111067984.1

(51) Int. Cl.
    *G06F 21/54* (2013.01)
    *G06F 21/55* (2013.01)
    *G06F 21/57* (2013.01)

(52) U.S. Cl.
    CPC ............ *G06F 21/54* (2013.01); *G06F 21/554* (2013.01); *G06F 21/577* (2013.01)

(58) Field of Classification Search
    CPC ....................................................... G06F 21/54
    See application file for complete search history.

(56) References Cited

U.S. PATENT DOCUMENTS

| 2008/0010225 | A1 | 1/2008 | Gonsalves et al. |
| 2014/0366017 | A1* | 12/2014 | Krten ...................... G06F 21/14 718/1 |
| 2015/0363580 | A1 | 12/2015 | Betouin et al. |
| 2017/0099307 | A1* | 4/2017 | Xu .......................... G06F 21/566 |

FOREIGN PATENT DOCUMENTS

| CN | 106650341 A | 5/2017 |
| CN | 107992724 A | 5/2018 |
| CN | 110647748 A | 1/2020 |
| CN | 111406379 A | 7/2020 |

(Continued)

*Primary Examiner* — Simon P Kanaan
(74) *Attorney, Agent, or Firm* — Seed IP Law Group LLP

(57) ABSTRACT

The present disclosure provides a method for intelligent obfuscation of mobile applications. The method includes: performing call detection on a method chain through aspect-oriented security to detect an abnormal call; identifying an attacked node in the method chain with respect to the abnormal call to determine a hardening location; identifying an attack means with respect to the abnormal call to determine hardening strength; selecting an automated hardening solution based on the hardening strength; and executing the selected automated hardening solution at the hardening location to control impact of the automated hardening on performance in a threshold range.

20 Claims, 5 Drawing Sheets

(56) References Cited

FOREIGN PATENT DOCUMENTS

| | | |
|---|---|---|
| CN | 111428237 A | 7/2020 |
| CN | 111614624 A | 9/2020 |
| CN | 111865909 A | 10/2020 |
| CN | 112804184 A | 5/2021 |
| CN | 113111347 A | 7/2021 |
| CN | 113779578 A | 12/2021 |
| CN | 114866355 A | 8/2022 |
| CN | 118228254 A | 6/2024 |
| KR | 102105020 B1 | 4/2020 |
| WO | 2023035751 A1 | 3/2023 |

\* cited by examiner

INTELLIGENT OBFUSCATION OF MOBILE APPLICATIONS

TECHNICAL FIELD

The present disclosure mainly relates to software obfuscation, and in particular, to intelligent obfuscation of mobile applications.

BACKGROUND

Currently, in the industry, obfuscation and hardening of applications ("Apps") is mostly obfuscation of intermediate files generated in a program compilation phase. For example, in the ollvm obfuscation and hardening technology, specific code logic is hardened by manually applying the ollvm to code and symbol levels. For another example, obfuscation strength and obfuscation elasticity are calculated based on analysis of code performance and complexity, thereby automatically outputting obfuscation.

SUMMARY

The application is directed to techniques of protecting a mobile application system, which prevent external tracing and analysis of logic by using a reverse means to attack a mobile application.

The technical solutions can quickly and efficiently perform automated protection and hardening on sensitive logic in a mobile application.

The present disclosure provides a solution for intelligent obfuscation of mobile applications. In this solution, resource calls can be detected through an introspection capability of an aspect-oriented security system for the mobile applications, to identify an attacked node and an attack means for an abnormal call, so as to automatically select a hardening solution pertinently for hardening.

An implementation of the present disclosure provides a method for intelligent obfuscation of mobile applications, including: performing call detection on a method chain through aspect-oriented security to detect an abnormal call; identifying an attacked node in the method chain with respect to the abnormal call to determine a hardening location; identifying an attack means with respect to the abnormal call to determine hardening strength; selecting an automated hardening solution based on the hardening strength; and executing the selected automated hardening solution at the hardening location to control impact of the automated hardening on performance in a threshold range.

In an implementation of the present disclosure, the abnormal call is detected based on a Hook mechanism of a dynamic proxy.

In an implementation of the present disclosure, the abnormal call corresponds to a static analysis or a dynamic analysis.

In an implementation of the present disclosure, the aspect-oriented security is a security layer interleaved and in parallel with a business concern.

In an implementation of the present disclosure, the attacked node in the method chain includes one or more of a reflection/dynamic proxy Hook point, a JNI interface call Hook point, a class load path Hook point, a JNI function Hook point, a dynamic link library Hook point, or an inline Hook point.

In an implementation of the present disclosure, the attack means includes an attack means corresponding to a static analysis, an attack means corresponding to a dynamic analysis, or an attack means corresponding to both a static analysis and a dynamic analysis.

In an implementation of the present disclosure, the hardening strength can be determined from one or more of a weak hardening strength, a medium hardening strength, or a strong hardening strength.

In an implementation of the present disclosure, the automated hardening solution selected based on the weak hardening strength uses static obfuscation.

In an implementation of the present disclosure, the automated hardening solution selected based on the medium hardening strength uses dynamic obfuscation.

In an implementation of the present disclosure, the automated hardening solution selected based on the strong hardening strength uses dynamic obfuscation or a combination of static obfuscation and dynamic obfuscation.

An implementation of the present disclosure provides a system for intelligent obfuscation of mobile applications, including: a detection module, configured to perform call detection on a method chain through aspect-oriented security to detect an abnormal call; an identification module, configured to identify an attacked node in the method chain with respect to the abnormal call to determine a hardening location, and identify an attack means with respect to the abnormal call to determine hardening strength; a hardening selection module, configured to select an automated hardening solution based on the hardening strength; and a hardening execution module, configured to execute the selected automated hardening solution at the hardening location to control impact of the automated hardening on performance in a threshold range.

In an implementation of the present disclosure, the abnormal call corresponds to a static analysis or a dynamic analysis.

In an implementation of the present disclosure, the attack means includes an attack means corresponding to a static analysis, an attack means corresponding to a dynamic analysis, or an attack means corresponding to both a static analysis and a dynamic analysis.

In an implementation of the present disclosure, the hardening strength can be determined from one or more of a weak hardening strength, a medium hardening strength, or a strong hardening strength.

In an implementation of the present disclosure, the automated hardening solution selected by the hardening selection module based on the weak hardening strength uses static obfuscation.

In an implementation of the present disclosure, the automated hardening solution selected by the hardening module based on the medium hardening strength uses dynamic obfuscation.

In an implementation of the present disclosure, the automated hardening solution selected by the hardening selection module based on the strong hardening strength uses dynamic obfuscation or a combination of static obfuscation and dynamic obfuscation.

An implementation of the present disclosure provides a computer-readable storage medium storing instructions. When these instructions are executed, a machine is enabled to perform the method described above.

This overview is provided to introduce in a simplified form some concepts that are further described below in the detailed description. This overview is not intended to identify key features or essential features of the claimed subject matter, or intended to limit the scope of the claimed subject matter.

BRIEF DESCRIPTION OF DRAWINGS

The above inventive content and the following specific implementations of the present disclosure are better understood when read with reference to the accompanying drawings. It should be noted that the accompanying drawings are merely used as examples of the claimed invention. In the accompanying drawings, the same reference numerals represent the same or similar elements.

DESCRIPTION OF EMBODIMENTS

Figure 1:
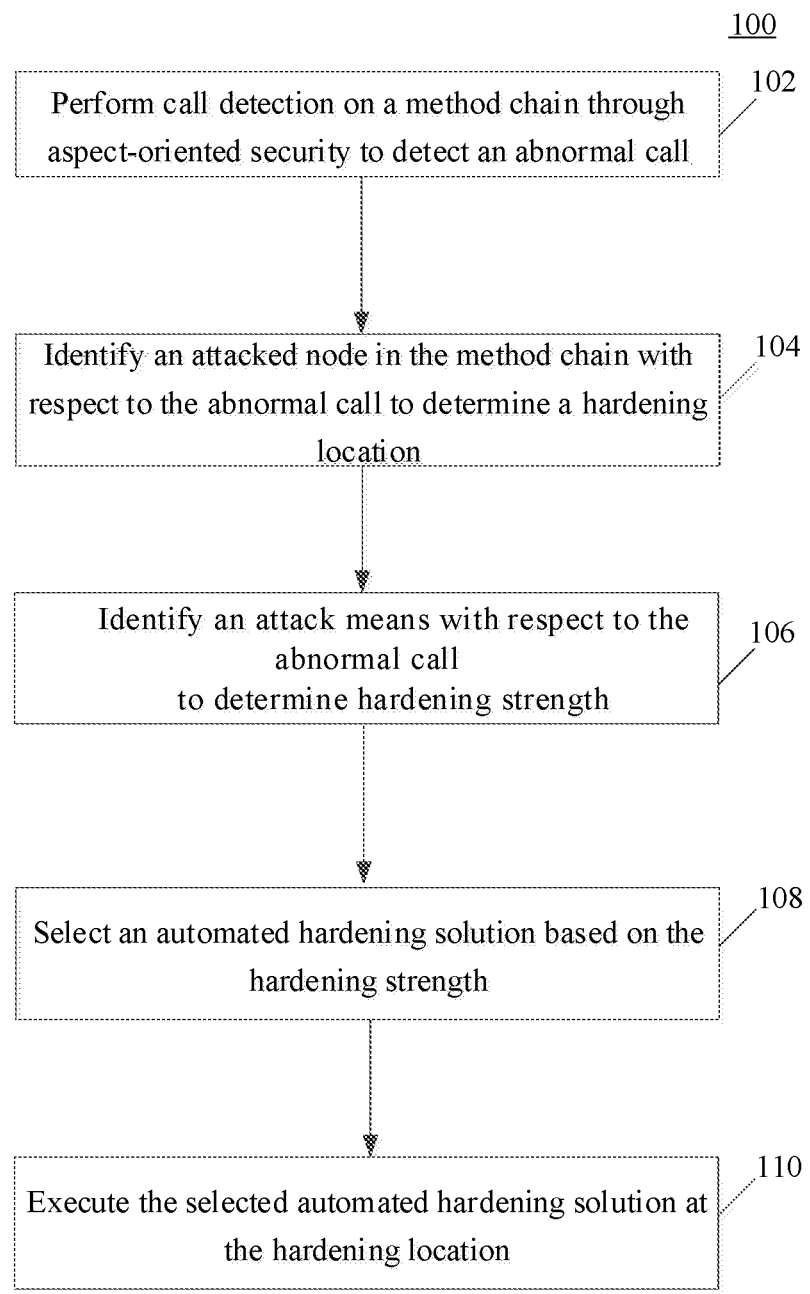
FIG. 1 is a flowchart illustrating a method for intelligent obfuscation of mobile applications according to an implementation of the present disclosure.

To make the technical features, characteristics, and technical benefits of the present disclosure clearer and easier to understand, the following describes example implementations of the present disclosure in detail with reference to the accompanying drawings.

Many example details are described in the following description to facilitate full understanding of the present disclosure. However, the present disclosure can be implemented in other manners different from those described herein. Therefore, the present disclosure is not limited to the example implementations described herein.

In today's digital era, the number of mobile applications is increasing explosively, covering various industries such as e-commerce, internet community, medical care, real estate, and industrial control. Cyberattacks are also transferred from conventional PC websites to the mobile internet while mobile internet brought convenience to human beings.

The cyberattack can be a reverse interpretation program for a mobile application, which modifies important code and a connection manner of a server and performs repacking and resigning, to generate an application that is the same as or similar to the original application, thereby seeking benefits. Alternatively or additionally, malicious code can be added after an application is cracked, for example, obtaining sensitive information such as album data, an address book, and SMS message data, and monitoring a bank account.

An application ("App") obfuscation technology used in the art is basically performing obfuscation on intermediate files generated in a program compilation phase, and is mainly a solution that generates certain obfuscation strength based on complexity and performance of the program. However, in the mobile applications, in addition to considering impact of performance, attention is also paid to logic that is to be protected. In this case, the logic will be tracked and analyzed externally by using a reverse means. Therefore, obfuscation of the intermediate files commonly used in the art is not suitable for pertinent protection of the logic.

An aspect-oriented security system is incorporated into the solution for intelligent obfuscation of mobile applications in the present disclosure, and a risk point actually attacked in the mobile application is found through aspect-oriented security, to pertinently harden the mobile application. According to the solutions for intelligent obfuscation of mobile applications in the present disclosure, a method chain is restored to implement secure introspection and tracing, and the solution has a strong perception capability. In addition, information about a node in the method chain is analyzed to implement efficient and pertinent hardening.

Android mobile applications are mainly used as examples in the present disclosure to describe the solutions for intelligent obfuscation of mobile applications. However, a person skilled in the art can understand that the technical solutions in the present disclosure are also applicable to iOS mobile applications and other mobile application systems, and details are omitted below.

FIG. 1 is a flowchart illustrating a method 100 for intelligent obfuscation of mobile applications according to an implementation of the present disclosure.

At 102, method call detection is performed on a method chain through aspect-oriented security to detect an abnormal call.

In an aspect-oriented security system or framework, a security layer interleaved and in parallel with a business concern is established, so that security can penetrate into business logic to implement detailed observation. In addition, decoupling of the business and security is also ensured, so that the business and security are independent of each other and both run efficiently. The aspect-oriented security system uses aspect-oriented programming (AOP). For example, a function is dynamically added to a program through pre-compilation, a dynamic proxy during running, or injection without modifying source code. The AOP implements decoupling of a method caller ("caller") and a method callee ("callee"), and can provide cross-module function aggregation. The AOP is suitable for implementing a system function related to cross-cut in a program.

Because the aspect-oriented security system has an introspection capability of accessing core resources during App running, a risky method call can be detected by detecting the method chain, and generation of a hardening solution can be deduced.

At 104, an attacked node in the method chain is identified with respect to the abnormal call to determine a hardening location.

In an Android mobile application, a Hook mechanism of a dynamic proxy is used for example implementation of AOP programming. The Hook mechanism can implement precise cut for different nodes and different granularities in the method chain. A process of determining different attacked nodes based on a method chain abnormality according to an implementation of the present disclosure is described in detail below with reference to FIG. 4. In an implementation of the present disclosure, the attacked node in the method chain includes one or more of a reflection/dynamic proxy Hook point, a JNI interface call Hook point, a class load path Hook point, a JNI function Hook point, a dynamic link library Hook point, or an inline Hook point.

When the attacked node in the method chain is identified with respect to the abnormal call, the hardening location can be determined.

A person skilled in the art can understand that there may be one or more attacked nodes, and the attacked nodes can be pertinently hardened one by one at hardening locations.

At 106, an attack means with respect to the abnormal call is identified to determine hardening strength.

Because the Hook mechanism can implement precise cut for different nodes and different granularities in the method chain, the Hook mechanism is usually used to handle the attack means like a static analysis (e.g., a reflection call) and a dynamic analysis (e.g., code injection, stack tracking, or Trojan Horse hijacking).

The static analysis usually does not run code, but analyzes a static feature and a functional module of the code. The static analysis can depict an outline of a program, including a control flow and a data structure. A protection method corresponding to a static analysis attack is static obfuscation. Static obfuscation can be mainly divided into control flow obfuscation and data structure obfuscation. For example, a static control flow obfuscation method includes junk code and control flow flattening, etc., and a data structure obfuscation method includes combining and splitting classes and structures, hiding a virtual table, etc.

The dynamic analysis runs code in a controllable environment, monitors all operations of the code, and observes a change in a state and an execution flow of the code, to obtain various data in the execution process. The dynamic analysis includes debugging, dissection, tracing, a simulator, etc. A protection method corresponding to a dynamic analysis attack is dynamic obfuscation. Dynamic obfuscation mainly includes an obfuscation means such as self-modifying code and virtual machine protection. Self-modifying code is a mechanism for modifying or generating code during program running, which stores instructions and data in the same memory space, so that the instructions can be considered as data to be read and modified by other instructions. During running, the program writes data into a code segment, and the written data is executed as an instruction to achieve a self-modifying effect. The self-modifying protection mechanism can effectively resist static reverse analysis. In addition, the code appears in a plaintext form only when necessary, which can prevent, to some extent, a reverse tool from obtaining all code of the program in a plaintext form, thereby resisting dynamic analysis. Virtual machine protection is to add a layer of customized instruction set to a virtual machine, and the virtual machine protection is difficult to reverse. To obtain source code of the program, a cracker first needs to understand the instruction set of the virtual machine, which greatly increases reverse overheads. The virtual machine protection technology obtains higher protection strength by increasing complexity and overheads in time and space.

A corresponding hardening strength is determined after the attack means of an attack on the method chain has been identified, e.g., whether it is a static analysis, a dynamic analysis, or a combination of a static analysis and a dynamic analysis.

In an implementation of the present disclosure, if the attack means only corresponds to a static analysis, the determined hardening strength is a weak hardening strength; if the attack means corresponds to a dynamic analysis, the determined hardening strength is a medium hardening strength; and if the attack means corresponds to a combination of a static analysis and a dynamic analysis, the determined hardening strength is a strong hardening strength.

It can be understood by a person skilled in the art that, in different network application scenarios, attack means are complex, and the hardening strength can be determined based on a requirement. Details are omitted herein for simplicity.

At 108, an automated hardening solution is selected based on the hardening strength.

The automated hardening solution can be selected based on the hardening strength determined in 106. The automated hardening solution can be set differently based on a scenario.

In an implementation of the present disclosure, the automated hardening solution selected based on the weak hardening strength uses static obfuscation, the automated hardening solution selected based on the medium hardening strength uses dynamic obfuscation, and the automated hardening solution selected based on the strong hardening strength uses a combination of static obfuscation and dynamic obfuscation.

It should be appreciated that in different network application scenarios, attack means can be complex, and the automated hardening solution can be set based on different use requirements.

For example, static obfuscation means can include the following: a sensitive string in source code of an App is randomly encrypted, and string encryption for dynamic string decryption is performed during running; an obfuscation operation of symbol obfuscation is performed on class names and function names in the App; an obfuscation operation of local variable name obfuscation is performed on variable names in the source code; execution control logic is converted into flat control logic, and control flow flattening of deep obfuscation is performed from an abstract syntax tree level; instruction replacement for implementing equivalent conversion is performed on an operation expression in the code; obfuscation diversification of random technologies is introduced into the obfuscation process; a branch in the code jumps to an opaque predicate of a determining condition, and so on.

Therefore, control flow obfuscation, symbol obfuscation, etc., are implemented by using diversified static protection means to comprehensively protect code, thereby greatly improving a static reverse capability of the code.

For example, dynamic obfuscation means can include the following: Anti-dynamic debugging is performed on an App, and when it is detected that a class, a method, and a function that are configured with an anti-dynamic debugging function are dynamically debugged by a reverse tool, the App automatically exits a running operation. When an injection operation for the App is detected, the App automatically exits anti-dynamic injection that is run and operated. When a dynamic Hook is detected, the App automatically exits anti-Hook protection that is operated. When it is found that a code segment in the App is tampered with, the App automatically exits code segment verification that is running. Integrity check is performed on a function specified in the App, which triggers the App to crash when the application is re-signed and code integrity is broken.

In an implementation of the present disclosure, the automated hardening solution can determine, based on use requirements, rules for using the static obfuscation means and the dynamic obfuscation means. A person skilled in the art can understand that the automated hardening solution in the present disclosure is not limited to using the static obfuscation means and the dynamic obfuscation means enumerated herein, and can incorporate other obfuscation means as the technology advances.

At 110, the selected automated hardening solution is executed at the hardening location to control impact of the automated hardening on performance in a threshold range.

The automated hardening solution selected in 108 is executed at the hardening location determined in 104. After the automated hardening solution is executed, obfuscation strength and system stability are automatically evaluated. If the performance exceeds a maximum expansion value predetermined by a rule, a hardening solution is rolled back, that is, hardening is not performed. If the performance is in a maximum value range of performance expansion, hardening is performed.

In an implementation of the present disclosure, through gradual convergence of compilation parameters, impact of obfuscation on performance is controlled in an acceptable range, e.g., a threshold range, so that a finally selected automated hardening solution is a hardening solution that emphasizes both strength and stability.

The aspect-oriented security system is incorporated into the method for intelligent obfuscation of mobile applications disclosed in the present disclosure, and a risk point actually attacked in the mobile application is identified by using the aspect-oriented security, to pertinently harden the mobile application. According to the method for intelligent obfuscation of mobile applications in the present disclosure, the method chain is restored to implement secure introspection and tracing, and the method has a strong perception capability. In addition, information about a node in the method chain is analyzed to implement efficient and pertinent hardening.

Figure 2:
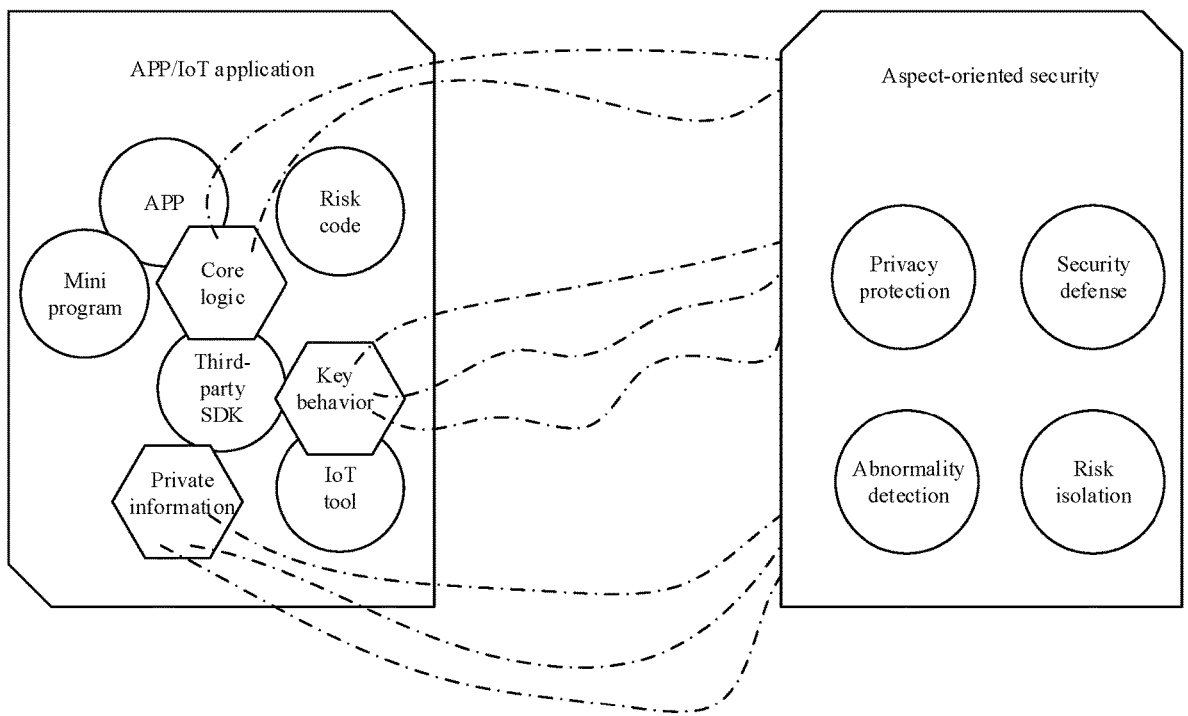
FIG. 2 is a schematic diagram illustrating an aspect-oriented security system according to an implementation of the present disclosure.

FIG. 2 is a schematic diagram illustrating an aspect-oriented security system according to an implementation of the present disclosure.

In the aspect-oriented security system in FIG. 2, an aspect-oriented security defense layer is embedded in a framework of an entire APP, and a rule engine and an upgrade capability that run independently are maintained. All key security-related interfaces in the APP are protected by aspects, which actually means that security services are provided for direct business concerns, e.g., straight-cutting concerns, which are cross-cutting concerns. Modularization of the cross-cutting concern is an aspect.

An aspect-oriented software security architecture is used to implement security pointcut, so as to dynamically add a security function to the program without modifying source code. When determining whether a call is proper, the aspect-oriented security checks link information of the call through tracing, and makes perspective on a call risk of the link, to make accurate and comprehensive determining.

For example, the aspect-oriented security system shown in FIG. 2 uses an aspect to define a security pointcut and a notified object, uses a joint point to perceive a security event, an object, a service, business data, etc. and further uses a pointcut to define all operations of the joint point, so as to enhance encircling of a point that needs security care. In this case, a capability of making perspective on data is required.

As shown in FIG. 2, for example, in a scenario according to this implementation of the present disclosure, core logic, key behavior, privacy information, etc. are points that need security care, and one or more pointcuts can be respectively defined for the points to enhance encircling. In this implementation, the aspect-oriented security system shown in FIG. 2 can enhance encircling of the above secure pointcuts by using a plurality of technical means such as privacy protection, security defense, abnormality detection, and risk isolation.

The secure aspect system shown in FIG. 2 uses advice to describe work that needs to be completed by the aspect, and describes when to perform the work. In a scenario according to this implementation of the present disclosure, an advice type that can be applied includes: Before—the advice is called before a method call; After—the advice is called after a method is completed, regardless of whether the method is successfully performed; After-returning—the advice is called after the method is successfully performed; and After-throwing—the advice is made after the method throws an abnormality.

The aspect-oriented security system shown in FIG. 2 further enhances a security capability of a current service by using a proxy. Non-core functions such as log recording, performance monitoring, abnormality processing, circuit breaking, and current limit are separately extracted to be separated from business code, and are located on core business code through straight-cutting.

Obtaining all-link information is a core of the aspect-oriented security system. Because the aspect-oriented security system is integrated into a whole system, the aspect-oriented security system can obtain a large amount of real, complete, and detailed data to build an abnormality detection capability and an attack blocking capability. In other words, a method chain is restored to implement secure introspection and tracing, and code node information is analyzed and an attack risk point is positioned to implement pertinent hardening.

Figure 3:
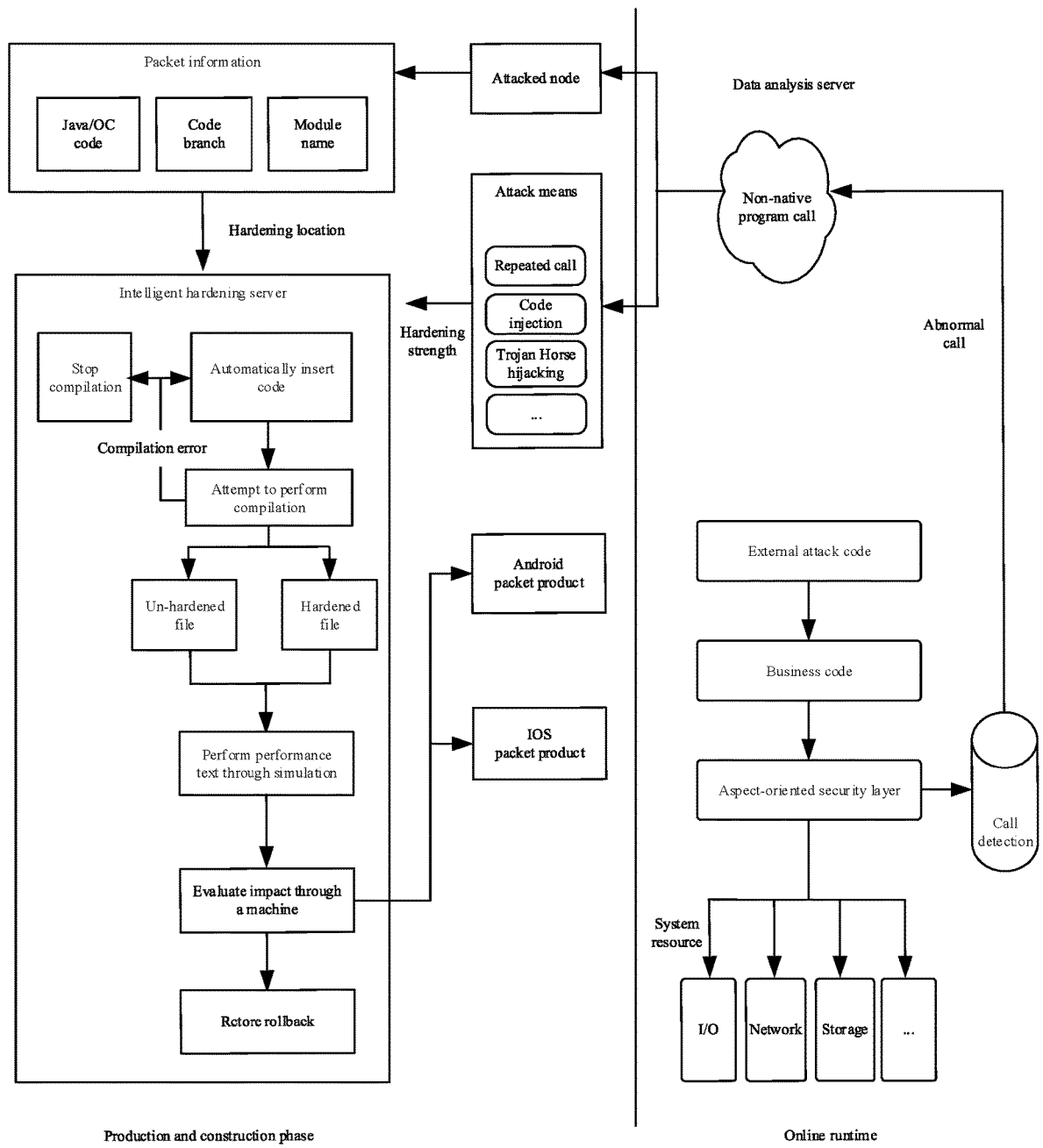
FIG. 3 is a schematic diagram illustrating a process of performing intelligent obfuscation based on aspect-oriented security according to an implementation of the present disclosure.

FIG. 3 is a schematic diagram illustrating a process of performing intelligent obfuscation based on aspect-oriented security according to an implementation of the present disclosure.

At an aspect-oriented security layer, because system resources are taken over, a call on the system resources by each business can be obtained. For example, in a stack, it is determined, by using a module name and a path corresponding to each symbol, whether the symbol belongs to a call source of a native program; otherwise, the symbol is reported to a cloud for analysis.

In an implementation of the present disclosure, it can be determined whether a Hook framework (such as Xpose) and a call address or symbol information of an external dynamic library exist in a method chain.

In an implementation of the present disclosure, it can be determined in the method chain whether a source address of a call has a Hook risk. For example, a start address corresponding to a function address does not jump to an assembly instruction, or an address of a system function belongs to a module of an external third party.

A cloud data analysis server performs deduplication on different stacks and attacked nodes (which are symbols in this implementation), and learns, through analysis, corresponding attacked symbols and attack means (for example, a reflection call, code injection, and Trojan Horse hijacking). The attacked symbol associates packet-related information by using the cloud server, and finds a corresponding module, a code repository, and a code location corresponding to the corresponding attacked symbol.

After receiving a hardening instruction, an intelligent hardening server generates a hardening rule at the beginning of a function and a compiler based on a corresponding attack means, configures an obfuscation parameter in the compiler, and inserts a related symbol in a head of the corresponding function to be identified by an ollvm compiler. The attack means and the corresponding hardening solution can be manually formulated into a rule, and a maximum value range of performance expansion that can be tolerated by corresponding strength is input to be automatically executed in a subsequent procedure. In this implementation, hardening means include three types: constant protection, code obfuscation, and symbol obfuscation.

During a compilation attempt, related compilation configuration is automatically optimized based on a compilation error report to perform a retry. If the compilation still fails after a certain number of retries, hardening is given up. If the compilation succeeds, an un-hardened product (original product) and a hardened product are generated.

Finally, a corresponding hardening function is performed on the hardened product through simulation to perform performance comparison. If performance exceeds a maximum expansion value predetermined by a rule, a hardening solution is rolled back, that is, hardening is not performed. If the performance is in a maximum range of performance expansion, hardening is performed.

Figure 4:
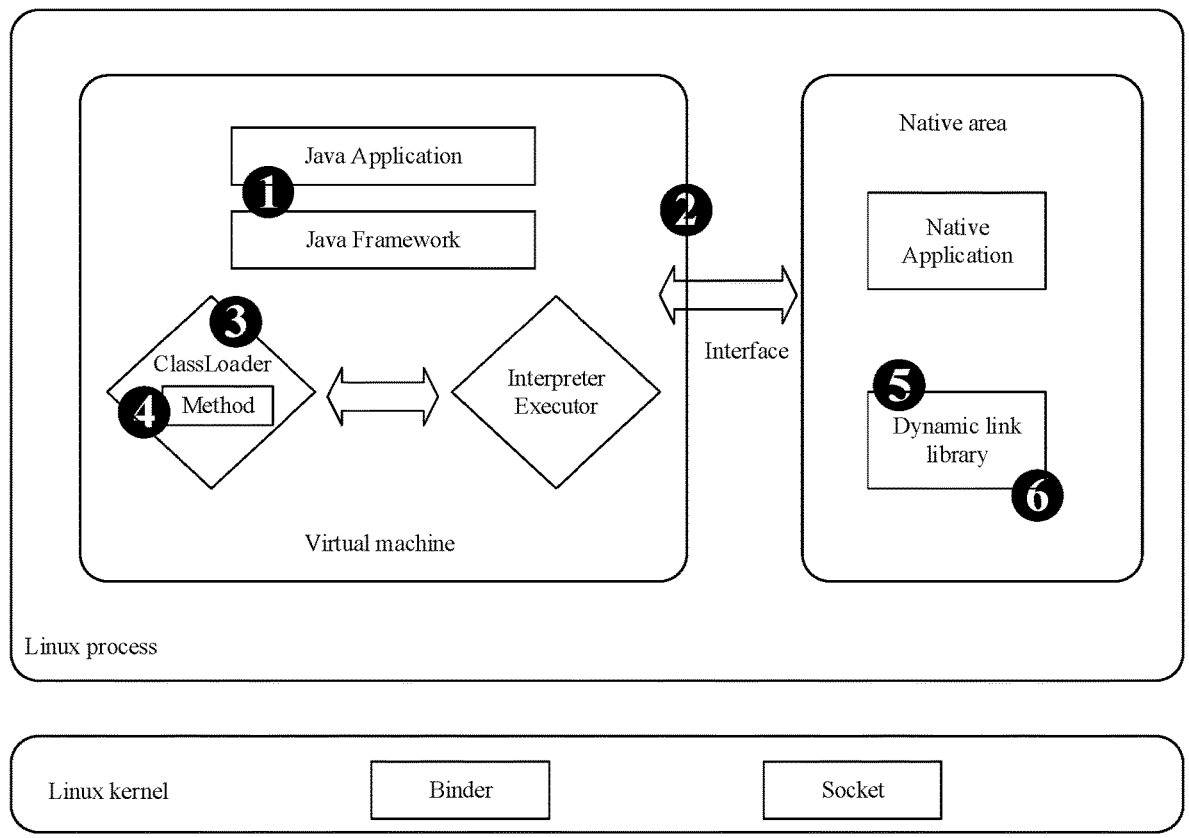
FIG. 4 is a schematic diagram illustrating a process of determining different attacked nodes based on a method chain abnormality according to an implementation of the present disclosure.

FIG. 4 is a schematic diagram illustrating a process of determining different attacked nodes based on a method chain abnormality according to an implementation of the present disclosure. In this implementation, a Hook mechanism of a dynamic proxy is used to implement precise cut for different nodes and different granularities in a method chain.

An Android process shown in FIG. 4 is illustratively a Linux process, and the Android process dynamically links a stack of dynamic link libraries SO. A virtual machine mainly runs in the Linux process. The virtual machine includes a ClassLoader, object/memory management, thread scheduling, etc., to provide a runtime environment for JAVA. The virtual machine includes two parts: JAVA Framework and application JAVA code. A mobile application usually further includes native code, and the native code runs in the Linux process together with the virtual machine. The Android process exchanges data based on a process communication interface provided by a Linux kernel, for example, Binder communication and socket communication.

The Hook mechanism can achieve an expected purpose by modifying these components in the Android process. In this implementation, the aspect-oriented security system in the present disclosure can detect different nodes in a Hook method chain to determine a possible attacked location and a possible attack means.

At node 1 shown in FIG. 4, the Hook mechanism acts at a Java layer. The virtual machine provides a reflection/dynamic proxy used as a standard programming interface. The reflection API can help access and modify a private attribute, and the dynamic proxy can directly construct a proxy object dynamically from the interface and monitor the object. For example, at node 1 (i.e., a reflection/dynamic proxy Hook node), the Hook mechanism usually constructs a proxy object with the dynamic proxy, and then replaces an object in the process with the reflection API to achieve the purpose of Hook. If it is determined that a call for node 1 is abnormal, obfuscation for a static analysis, such as variable name obfuscation or data stream obfuscation, can be used pertinently.

At node 2 shown in FIG. 4, a call between Java code and the native code is implemented by using a JNI interface, and function pointers of all JNI interfaces are stored in a table of the virtual machine. Therefore, the Hook mechanism acting at node 2 (i.e., a JNI interface call the Hook node) can be implemented by modifying a function pointer. If it is determined that a call for node 2 is abnormal, data stream obfuscation, etc. for a static analysis can be used pertinently, to blur a call relationship of a function.

At node 3 shown in FIG. 4, a ClassLoader of the virtual machine needs to load the Java code to implement execution of the Java code. Therefore, the Hook mechanism acting at node 3 (i.e., a class load path Hook node) achieves the purpose by modifying a path for loading a Java class by the ClassLoader. If it is determined that a call for node 3 is abnormal, path obfuscation, etc., for a static analysis can be used pertinently.

At node 4 shown in FIG. 4, the Hook mechanism acts on the virtual machine. The virtual machine provides the runtime environment for Java. All Java methods are stored in Map of the virtual machine for maintenance. Each Java method has a flag bit indicating whether the Java method is a JNI function. If the Java method is a JNI function, a corresponding native function is searched. Therefore, the Hook mechanism acting at node 4 (e.g., a JNI function Hook node) implements the corresponding native function by modifying a function of Hook to the JNI function. If it is determined that a call for node 4 is abnormal, obfuscation for dynamic analysis, such as virtual machine protection, can be used pertinently.

At node 5 shown in FIG. 4, when the Android process loads the dynamic link library, SO is read into a memory area in the current process by using a dlopen( ) function. When SO code is called, directly jump to the memory area of SO for execution. A function table and a function address provided by SO to the outside are also in this memory. Therefore, the Hook mechanism acting at node 5 (e.g., a dynamic link library Hook node) modifies the function address. If it is determined that a call for node 5 is abnormal, obfuscation for dynamic analysis, such as anti-dynamic Hook, can be used pertinently.

At node 6 shown in FIG. 4, in some scenarios, an internal function of Hook SO is needed, and in this case, an inline Hook technology needs to be used. A basic principle is to insert a Jump instruction in a target function execution area, so that a CPU jumps to a Hook function (shellcode). Implementation of inline Hook is strongly related to an instruction platform. Therefore, the Hook mechanism acting at node 6 (e.g., an inline Hook node) needs pertinent implementation of an instruction set. If it is determined that a call for node 6 is abnormal, obfuscation for dynamic analysis, such as anti-dynamic debugging, can be used pertinently.

As shown in FIG. 4, based on detection of different nodes in the method chain, an attacked node in the method chain can be identified, to further determine a hardening location. A person skilled in the art can understand that there may be one or more attacked nodes, and the attacked nodes can be pertinently hardened one by one at hardening locations by using the hardening solution.

Figure 5:
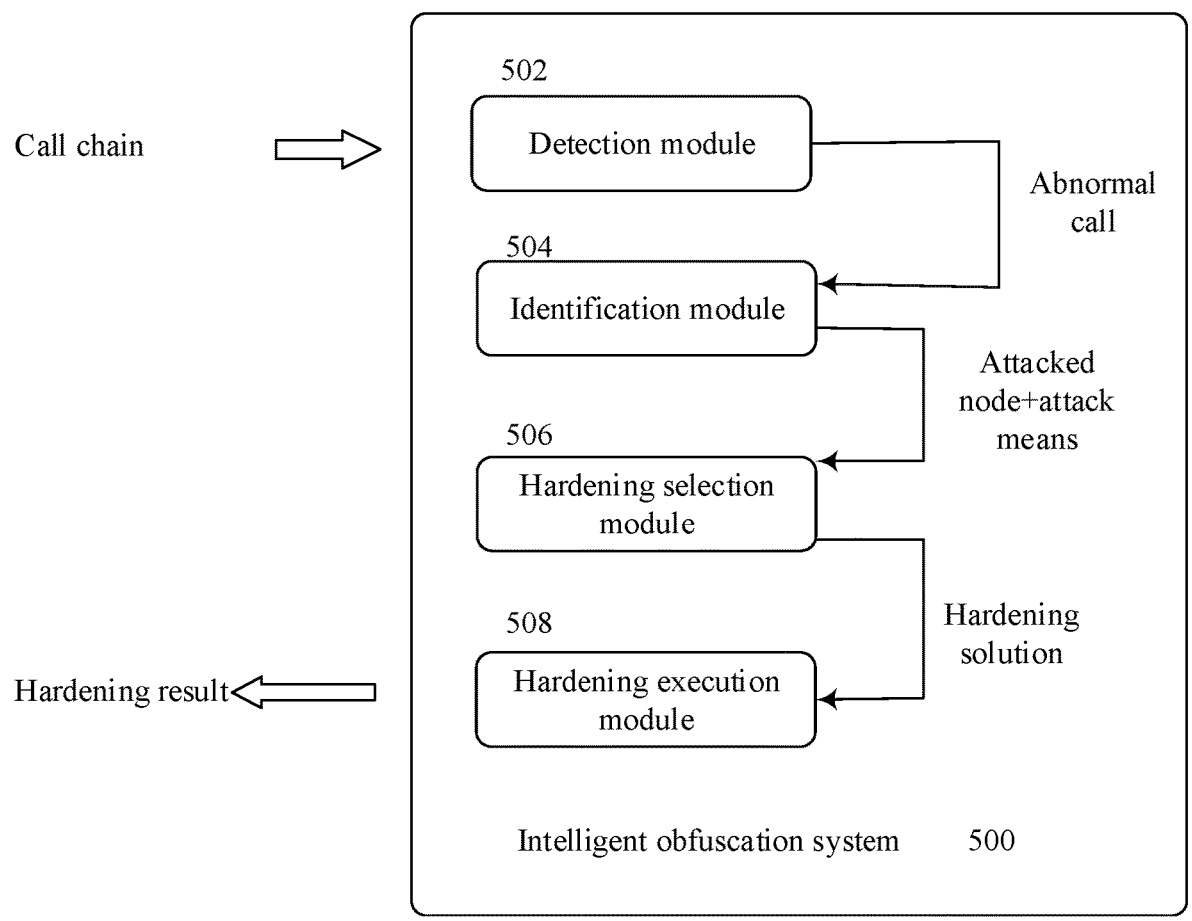
FIG. 5 is a block diagram illustrating a system for intelligent obfuscation of mobile applications according to an implementation of the present disclosure.

FIG. 5 is a block diagram illustrating a system 500 for intelligent obfuscation of mobile applications according to an implementation of the present disclosure.

The system 500 for intelligent obfuscation of mobile applications includes a detection module 502, an identification module 504, a hardening selection module 506, and a hardening execution module 508.

The detection module 502 performs call detection on a method chain through aspect-oriented security to detect an abnormal call.

As described above, because the aspect-oriented security system has an introspection capability of accessing core resources during App running, a risky call can be detected by detecting the method chain, and generation of a hardening solution can be deduced.

The identification module 504 identifies an attacked node in the method chain with respect to the abnormal call to determine a hardening location.

In an Android mobile application, a Hook mechanism of a dynamic proxy is used for specific implementation of AOP programming. The Hook mechanism can implement precise cut for different nodes and different granularities in the method chain. When the attacked node in the method chain is identified with respect to the abnormal call, the hardening location can be determined. A person skilled in the art can understand that there may be one or more attacked nodes, and the attacked nodes can be pertinently hardened one by one at hardening locations.

Further, the identification module 504 identifies an attack means with respect to the abnormal call to determine hardening strength.

Because the Hook mechanism can implement precise cut for different nodes and different granularities in the method chain, the attack means for the method chain corresponding to the Hook mechanism usually corresponds to a static analysis (e.g., a reflection call) and a dynamic analysis (e.g., code injection, stack tracking, or Trojan Horse hijacking).

A protection method corresponding to a static analysis attack is static obfuscation. Static obfuscation can be mainly divided into control flow obfuscation and data structure obfuscation. For example, a static control flow obfuscation method includes junk code and control flow flattening, etc., and a data structure obfuscation method includes combining and splitting classes and structures, hiding a virtual table, etc. A protection method corresponding to a dynamic analysis attack is dynamic obfuscation. Dynamic obfuscation mainly includes an obfuscation means such as self-modifying code and virtual machine protection.

The identification module 504 determines corresponding hardening strength after identifying that the attack means of an attack subjected by the method chain corresponds to which one of a static analysis, a dynamic analysis, or a combination of a static analysis and a dynamic analysis.

In an implementation of the present disclosure, if the attack means only corresponds to a static analysis, it is determined that the corresponding hardening strength is a weak hardening strength, e.g., for static obfuscation; if the attack means only corresponds to the dynamic analysis, it is determined that the corresponding hardening strength is a medium hardening strength, e.g., for a dynamic obfuscation; and if the attack means corresponds to a combination of a static analysis and a dynamic analysis, it is determined that the corresponding hardening strength is a strong hardening strength, e.g., for a combination of static obfuscation and dynamic obfuscation.

The hardening selection module 506 selects an automated hardening solution based on the hardening strength.

The hardening selection module 506 can select the automated hardening solution based on the hardening strength determined by the identification module 504. The automated hardening solution can be set differently based on a scenario.

For example, static obfuscation means can include string encryption, symbol obfuscation, local variable name obfuscation, control flow flattening, instruction replacement, obfuscation diversification, opaque predicates, etc.; and dynamic obfuscation means can include anti-dynamic debugging, anti-dynamic injection, anti-HOOK protection, code segment verification, integrity verification, etc.

Therefore, control flow obfuscation, symbol obfuscation, etc. are implemented by using diversified static protection means to comprehensively protect code, thereby greatly improving a reverse capability of the code.

The automated hardening solution in the present disclosure can determine, based on a requirement, rules for using the static obfuscation means and the dynamic obfuscation means.

The hardening execution module 508 executes the selected automated hardening solution at the hardening location to control impact of the automated hardening on performance in a threshold range.

The automated hardening solution selected by the hardening selection module 506 is executed at the hardening location determined by the identification module 504. After the automated hardening solution is executed, obfuscation strength and system stability are automatically evaluated.

In an implementation of the present disclosure, through gradual convergence of compilation parameters, impact of obfuscation on performance is controlled in a threshold range, so that a finally selected automated hardening solution is a hardening solution that emphasizes both strength and stability.

The aspect-oriented security system is incorporated into the system for intelligent obfuscation of mobile applications disclosed in the present disclosure, and a risk point actually attacked in the mobile application is identified by using the aspect-oriented security, to pertinently harden the mobile application. According to the system for intelligent obfuscation of mobile applications in the present disclosure, the method chain is restored to implement secure introspection and tracing, and the system has a strong perception capability. In addition, information about a node in the method chain is analyzed to implement efficient and pertinent hardening.

The steps and modules in the method and system for intelligent obfuscation of mobile applications described above can be implemented by hardware, software, or a combination thereof. If implemented in hardware, various illustrative steps, modules, and circuits described with reference to the present invention can be implemented or performed by a general-purpose processor, a digital signal processor (DSP), an application-specific integrated circuit (ASIC), a field programmable gate array (FPGA) or another programmable logic component, a hardware component, or any combination thereof. The general-purpose processor can be a processor, a microprocessor, a controller, a microcontroller, a state machine, etc. If implemented in software, various illustrative steps and modules described with reference to the present invention can be stored or transmitted as one or more instructions or code on a computer-readable medium. A software module that implements various operations in the present invention can reside in a storage medium, such as a RAM, a flash memory, a ROM, an EPROM, an EEPROM, a register, a hard disk, a removable disk, a CD-ROM, or a cloud storage. The storage medium can be coupled to a processor, so that the processor can read information from the storage medium/write information into the storage medium, and execute corresponding program modules to implement the steps in the present invention. In addition, software-based implementations can be uploaded, downloaded, or remotely accessed through an appropriate communication means. The appropriate communication means includes, for example, the Internet, the World Wide Web, the Intranet, software applications, cables (including optical fiber cables), magnetic communication, electromagnetic communication (including RF, microwave, and infrared communication), electronic communication, or other such communication means.

It should be further noted that these implementations may be described as processes depicted as flowcharts, flow diagrams, structural diagrams, or block diagrams. Although the flowcharts may describe the operations as sequential processes, many of these operations can be performed in parallel or concurrently. In addition, an order of these operations can be rearranged.

The disclosed methods, apparatuses, and systems shall not be limited in any way. In contrast, the present invention covers all novel and non-obvious features and aspects of various disclosed implementations (individual implementations and various combinations and sub-combinations of the implementations). The disclosed methods, apparatuses, and systems are not limited to any specific aspect or feature or combination thereof, and any disclosed implementation does not need to have any one or more specific advantages or resolve specific or all technical problems.

The implementations of the present invention are described above with reference to the accompanying drawings. However, the present invention is not limited to the above specific implementations. The above specific implementations are merely examples and are not intended for limitation. Under inspiration of the present invention, a person of ordinary skill in the art can make many changes without departing from the spirit of the present invention and the scope protected by the claims, and these changes all fall within the protection scope of the present invention.

What is claimed is:

1. A method, comprising:
    performing call detection on a method chain through aspect-oriented security to detect an abnormal call;
    identifying an attacked node in the method chain with respect to the abnormal call to determine a hardening location;
    identifying an attack means with respect to the abnormal call to determine hardening strength;
    selecting an automated hardening solution based on the hardening strength; and
    executing automated hardening solution at the hardening location to control an impact of the automated hardening on performance to be in a threshold range.

2. The method according to claim 1, wherein the abnormal call is detected based on a Hook mechanism of a dynamic proxy.

3. The method according to claim 1, wherein the abnormal call corresponds to one or more of a static analysis or a dynamic analysis.

4. The method according to claim 1, wherein the aspect-oriented security is a security layer interleaved and in parallel with a business concern.

5. The method according to claim 1, wherein the attacked node in the method chain includes one or more of a reflection/dynamic proxy Hook point, a JNI interface call Hook point, a class load path Hook point, a JNI function Hook point, a dynamic link library Hook point, or an inline Hook point.

6. The method according to claim 1, wherein the attack means includes one or more of an attack means corresponding to a static analysis, an attack means corresponding to a dynamic analysis, or an attack means corresponding to both a static analysis and a dynamic analysis.

7. The method according to claim 1, wherein the hardening strength is determined from one or more of a weak hardening strength, a medium hardening strength, or a strong hardening strength.

8. The method according to claim 7, wherein the automated hardening solution selected based on the weak hardening strength uses static obfuscation.

9. The method according to claim 7, wherein the automated hardening solution selected based on the medium hardening strength uses dynamic obfuscation.

10. The method according to claim 7, wherein the automated hardening solution selected based on the strong hardening strength uses dynamic obfuscation or a combination of static obfuscation and dynamic obfuscation.

11. A computer system one or more processors and one or more storage devices, the one or more storage devices, individually or collectively, having executable instructions stored thereon, the executable instructions, when executed by the one or more processors, enabling the one or more processors to, individually or collectively, perform operations, the operations comprising:
    performing call detection on a method chain through aspect-oriented security to detect an abnormal call;
    identifying an attacked node in the method chain with respect to the abnormal call to determine a hardening location;
    identifying an attack means with respect to the abnormal call to determine hardening strength;
    selecting an automated hardening solution based on the hardening strength; and
    executing the automated hardening solution at the hardening location to control impact of the automated hardening on performance in a threshold range.

12. The system according to claim 11, wherein the abnormal call corresponds to one or more of a static analysis or a dynamic analysis.

13. The system according to claim 11, wherein the attack means includes one or more of an attack means corresponding to a static analysis, an attack means corresponding to a dynamic analysis, or an attack means corresponding to both a static analysis and a dynamic analysis.

14. The system according to claim 11, wherein the hardening strength is determined from one or more of a weak hardening strength, a medium hardening strength, or a strong hardening strength.

15. The system according to claim 14, wherein the automated hardening solution selected by the hardening selection module based on the weak hardening strength uses static obfuscation.

16. The system according to claim 14, wherein the automated hardening solution selected by the hardening selection module based on the medium hardening strength uses dynamic obfuscation.

17. The system according to claim 15, wherein the automated hardening solution selected by the hardening selection module based on the strong hardening strength uses dynamic obfuscation or a combination of static obfuscation and dynamic obfuscation.

18. A non-transitory computer-readable storage medium storing computer executable instructions, wherein when the computer executable instructions are executed by one or more processors, the computer executable instructions enable the one or more processors to, individually or collectively, implement acts comprising:
    performing call detection on a method chain through aspect-oriented security to detect an abnormal call;
    identifying an attacked node in the method chain with respect to the abnormal call to determine a hardening location;
    identifying an attack means with respect to the abnormal call to determine hardening strength;
    selecting an automated hardening solution based on the hardening strength; and
    executing automated hardening solution at the hardening location to control an impact of the automated hardening on performance to be in a threshold range.

19. The non-transitory computer-readable storage medium according to claim 18, wherein the abnormal call is detected based on a Hook mechanism of a dynamic proxy.

20. The non-transitory computer-readable storage medium according to claim 18, wherein the abnormal call corresponds to one or more of a static analysis or a dynamic analysis.

* * * * *